(12) United States Patent
Dominique et al.

(10) Patent No.: US 7,856,071 B2
(45) Date of Patent: Dec. 21, 2010

(54) MULTI-PATH ACQUISITION IN THE PRESENCE OF VERY HIGH DATA RATE USERS

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1102 days.

(21) Appl. No.: 11/188,711

(22) Filed: Jul. 26, 2005

(65) Prior Publication Data

US 2007/0025469 A1    Feb. 1, 2007

(51) Int. Cl.
*H04L 27/00* (2006.01)
(52) U.S. Cl. .................... 375/316; 375/299; 375/306; 375/322; 375/341; 375/343; 370/206
(58) Field of Classification Search ............. 375/148, 375/130–132, 150, 316, 135–137, 142–145, 375/147, 152, 295, 299, 306, 219, 260, 273, 375/342–343, 354, 359, 371, 377, 302, 322
See application file for complete search history.

(56) References Cited

U.S. PATENT DOCUMENTS

| 6,356,607 | B1 | 3/2002 | Scott et al. | |
|---|---|---|---|---|
| 6,687,512 | B1 | 2/2004 | Shinozaki et al. | |
| 6,813,284 | B2 | 11/2004 | Vayanos et al. | |
| 6,859,445 | B1 | 2/2005 | Moon et al. | |
| 7,215,930 | B2 | 5/2007 | Malladi | |
| 7,333,466 | B2 * | 2/2008 | Moshavi et al. | 370/342 |
| 7,460,512 | B2 * | 12/2008 | Goodall et al. | 370/338 |
| 7,623,484 | B2 | 11/2009 | Dominique et al. | |
| 2002/0075946 | A1 | 6/2002 | Seo et al. | |
| 2002/0136278 | A1 | 9/2002 | Nakamura et al. | |
| 2002/0196767 | A1 | 12/2002 | Sim | |
| 2003/0053522 | A1 | 3/2003 | Hayoun et al. | |
| 2003/0054768 | A1 | 3/2003 | Challa et al. | |
| 2003/0081562 | A1 | 5/2003 | Iwamatsu et al. | |
| 2003/0112776 | A1 | 6/2003 | Brown et al. | |
| 2003/0128678 | A1 | 7/2003 | Subrahmanya et al. | |

(Continued)

FOREIGN PATENT DOCUMENTS

EP    1 353 451    10/2003

(Continued)

OTHER PUBLICATIONS

ETSI TS 125 211 V6.4.0 (Mar. 2005), Technical Specification, Universal Mobile Telecommunications System (UMTS); Physical channels and mapping of transport channels onto physical channels (FDD) (3GPP TS 25.211 verision 6.4.0 Release 6).

(Continued)

*Primary Examiner*—Shuwang Liu
*Assistant Examiner*—Hirdepal Singh
(74) *Attorney, Agent, or Firm*—Harness, Dickey & Pierce (57) ABSTRACT

A method of multi-path acquisition may include estimating a contribution of acquired users of a first type to a received signal, canceling the estimated contribution from the received signal to generate a resultant signal, and performing multi-path acquisition for users of the first type and users of a second type based on the resultant signal.

11 Claims, 8 Drawing Sheets

U.S. PATENT DOCUMENTS

| | | | |
|---|---|---|---|
| 2004/0028013 A1* | 2/2004 | Fitton et al. | 370/335 |
| 2004/0071193 A1* | 4/2004 | Atarashi et al. | 375/144 |
| 2004/0077357 A1 | 4/2004 | Nakada | |
| 2004/0240479 A1 | 12/2004 | Bohnhoff | |
| 2005/0002361 A1 | 1/2005 | Dick et al. | |
| 2005/0002444 A1 | 1/2005 | Wei et al. | |
| 2005/0002445 A1* | 1/2005 | Dunyak et al. | 375/148 |
| 2005/0101253 A1* | 5/2005 | Pajukoski et al. | 455/63.1 |
| 2006/0013289 A1* | 1/2006 | Hwang | 375/148 |
| 2006/0088081 A1* | 4/2006 | Withington et al. | 375/130 |
| 2006/0120438 A1* | 6/2006 | Reial | 375/148 |
| 2006/0256971 A1 | 11/2006 | Chong et al. | |
| 2007/0195864 A1 | 8/2007 | Jonsson et al. | |
| 2008/0075150 A1* | 3/2008 | Rouphael et al. | 375/150 |

FOREIGN PATENT DOCUMENTS

| | | |
|---|---|---|
| WO | WO 03/041292 | 5/2003 |
| WO | WO 03/061132 | 7/2003 |

OTHER PUBLICATIONS

3GPP TS 25.211 v4.6.0 (Sep. 2002), Technical Specification, 3$^{rd}$ Generation Partnership Project; Technical Specification Group Radio Access Network; Physical channels and mapping of transport channels onto physical channels (FDD) (Release 4).

"Universal Mobile Telecommunications System (UMTS); Physical channels and mapping of transport channels onto physical channels (FDD)"; (3GPP TS 25.211 version 5.0.0 Release 5): ETSI TS 125 211 V5.0.0 (Mar. 2002).

Qinqing Zhang et al: "Enhanced Power Ramping Scheme for UMTS Random Access Channel" Vehicular Technology Conference, 1999. VTC 1999—Fall. IEEE VTS 50$^{TH}$ Amsterdam, Netherlands Sep. 19-22, 1999, Piscataway, NJ, USA, IEEE, US, Sep. 19, 1999, pp. 2631-2635, XP010353383 ISBN: 0-7803-5435-4.

U.S. Office Action dated Mar. 19, 2009 for U.S. Appl. No. 11/138,362.

U.S. Office Action dated Apr. 17, 2009 for U.S. Appl. No. 11/179,577.

U.S. Office Action dated Oct. 27, 2009 for U.S. Appl. No. 11/179,577.

U.S. Office Action dated Dec. 16, 2009 for U.S. Appl. No. 11/138,362.

U.S. Office Action dated Dec. 7, 2009 for U.S. Appl. No. 11/179,576.

U.S. Office Action dated Aug. 26, 2009 for U.S. Appl. No. 11/179,576.

* cited by examiner

MULTI-PATH ACQUISITION IN THE PRESENCE OF VERY HIGH DATA RATE USERS

BACKGROUND OF THE INVENTION

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or Node B. The dedicated physical channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control subchannel in accordance with CDMA2000 protocols, etc.).

Newer versions of these standards, for example, Release 6 of UMTS provide for high data rate uplink channels referred to as enhanced dedicated physical channels. These enhanced dedicated physical channels may include an enhanced data part (e.g., an enhanced dedicated physical data channel (E-DPDCH) in accordance with UMTS protocols) and an enhanced control part (e.g., an enhanced dedicated physical control channel (E-DPCCH)) in accordance with UMTS protocols.

Figure 1:
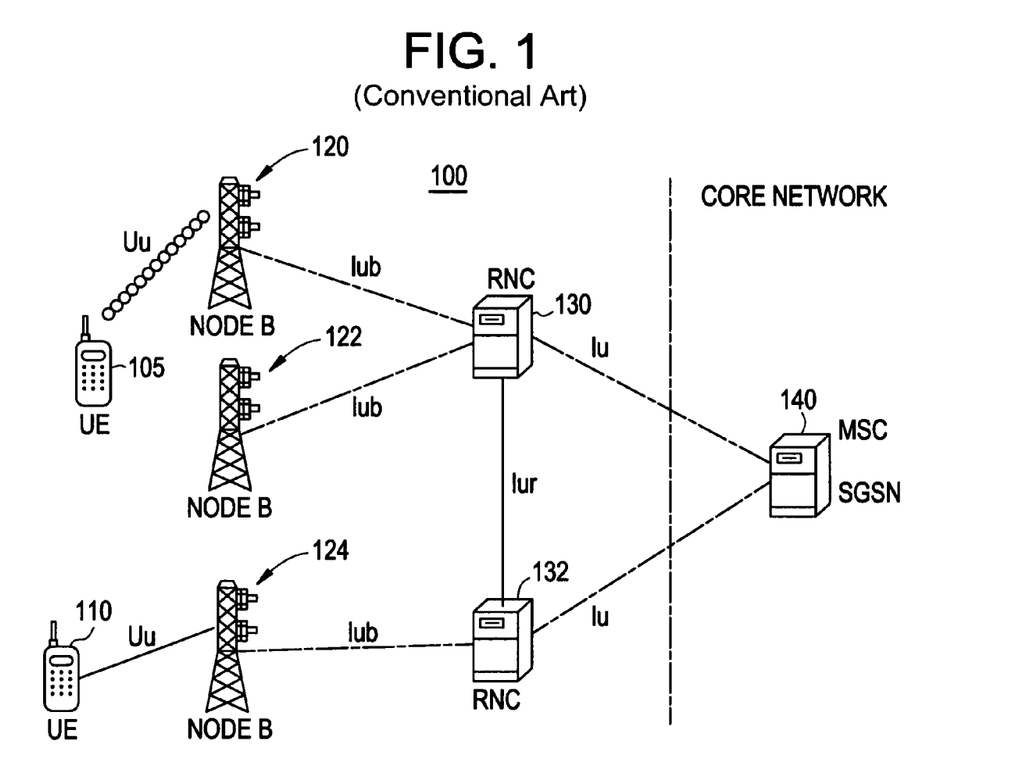
FIG. 1 illustrates a conventional wireless communication system 100 operating in accordance with UMTS protocols.

FIG. 1 illustrates a conventional wireless communication system 100 operating in accordance with UMTS protocols. Referring to FIG. 1, the wireless communication system 100 may include a number of Node Bs such as Node Bs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The Node Bs are connected to an RNC (radio network controller) such as RNCs 130 and 132, and the RNCs are connected to a MSC/SGSN 140. The RNC handles certain call and data handling functions, such as, autonomously managing handovers without involving MSCs (mobile station controller) and SGSNs (Serving GPRS Support Node). The MSC/SGSN 140 handles routing calls and/or data to other elements (e.g., RNCs 130/132 and Node Bs 120/122/124) in the network or to an external network. Further illustrated in FIG. 1 are interfaces Uu, Iub, Iur and Iub between these elements.

Figure 2A:
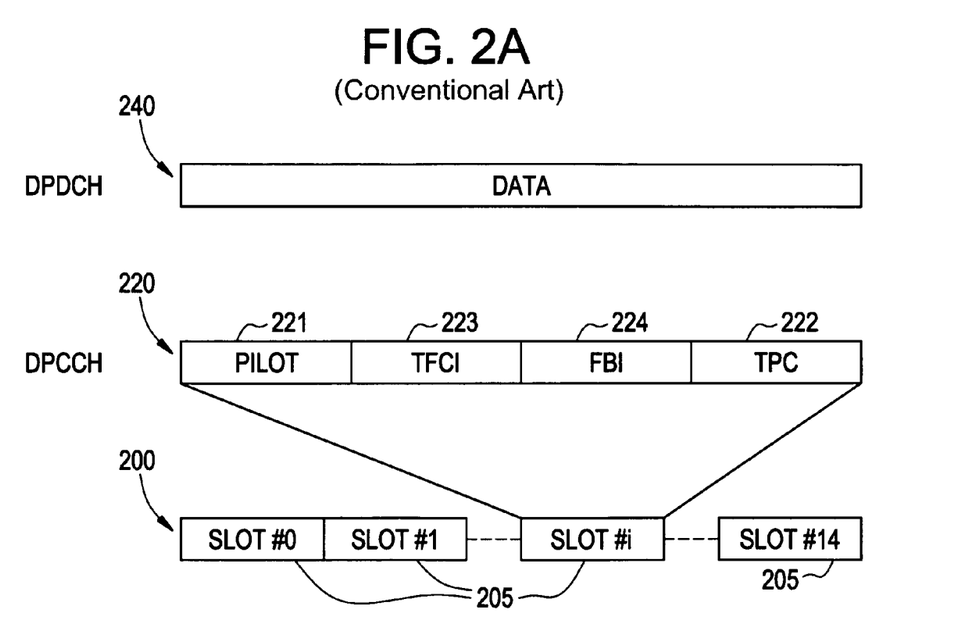
FIG. 2A illustrates an example of a conventional frame structure of uplink dedicated physical channels.

An example of a frame structure for the UMTS uplink dedicated physical channels is illustrated in FIG. 2A. Each frame 200 may have a length of, for example, 10 milliseconds (ms) and may be partitioned into 15 slots 205. Each slot 205 may have a length of, for example, 2560 chips, which corresponds to one power-control period, and may have a duration of, for example, 2/3 ms.

The uplink dedicated physical channels include a DPDCH 240 and a DPCCH 220, and each of the DPCCH 220 and the DPDCH 240 may be code multiplexed. The DPDCH 240 may include information transmitted from the legacy user 105. The DPCCH 220 may include control information, for example, a pilot signal 221, transmit power control information (e.g., transmit power control (TPC) bits) 222, a transport format combination indicator (TFCI) value 223 and feedback information (FBI) 224 (which may be used or unused).

The TFCI 223 may inform the Node B 120/122/124 of the transport format information (e.g., voice and/or data packets sizes, coding types, etc.) transmitted from the legacy user 105. The legacy user 105 and the Node Bs 120/122/124 may generate transmit power control (TPC) commands 222 to control each others transmit power. When a user 105 communicates with, for example, a single Node B 120/122/124, a single transmit power control command may be received in the TPC information 222 of each timeslot.

While FIG. 2A illustrates a 3GPP-UMTS uplink frame structure, a 3GPP2-CDMA2000 uplink frame structure may be similar. However, a typical 3GPP2-CDMA2000 uplink frame structure does not include the above-described TFCI 223 and FBI 224.

Figure 2B:
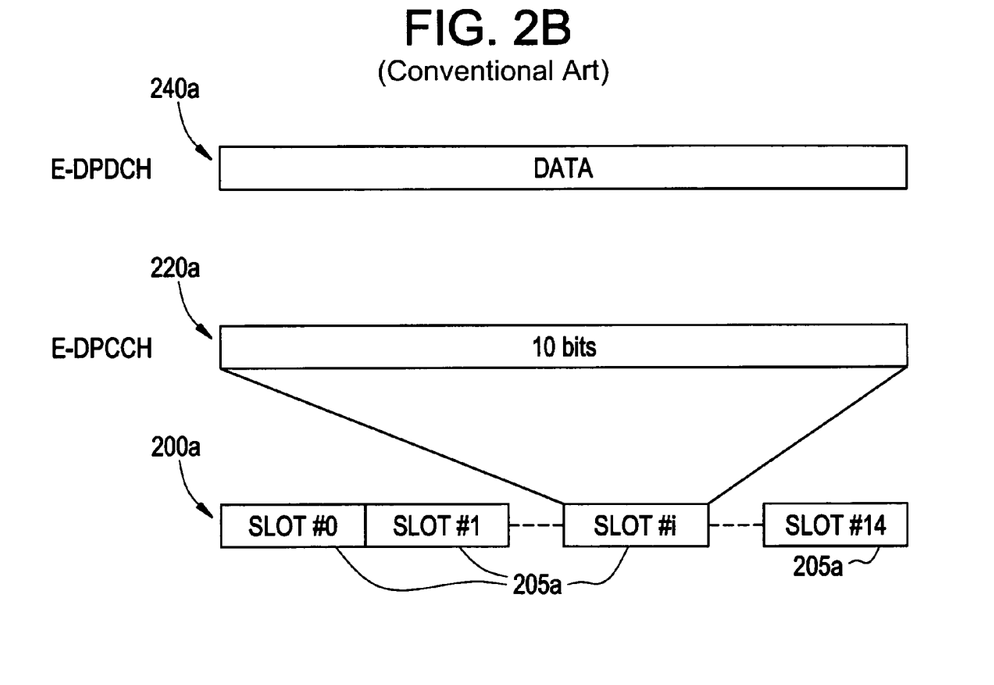
FIG. 2B illustrates an example of a conventional frame structure of enhanced uplink dedicated physical channels.

An example of a frame structure for the enhanced uplink dedicated physical channels (e.g., E-DPCCH and E-DPDCH), is illustrated in FIG. 2B. Each frame 200a may have a length of, for example, 10 milliseconds (ms) and may be partitioned into 15 slots 205a. Each slot 205a may have a length of, for example, 2560 chips, which corresponds to one power-control period, and may have a duration of, for example, 2/3 ms.

The enhanced uplink dedicated physical channels include an E-DPDCH 240a and an E-DPCCH 220a, and each of the E-DPCCH 220a and the E-DPDCH 240a may be code multiplexed.

The E-DPDCH 240a may include information transmitted from the user 110. The E-DPCCH 220a may include control information, for example, a happy bit (H-bit) signal, transport format combination indicator (E-TFCI), and retransmission sequence number (RSN), which are coded and occupy at least three slots (e.g., 1 subframe) within the frame of FIG. 2B.

The E-TFCI may inform the Node B 120/122/124 of the transport format of information (e.g., data packets sizes, TTI length, etc.) transmitted from the enhanced user 110.

Figure 3A:
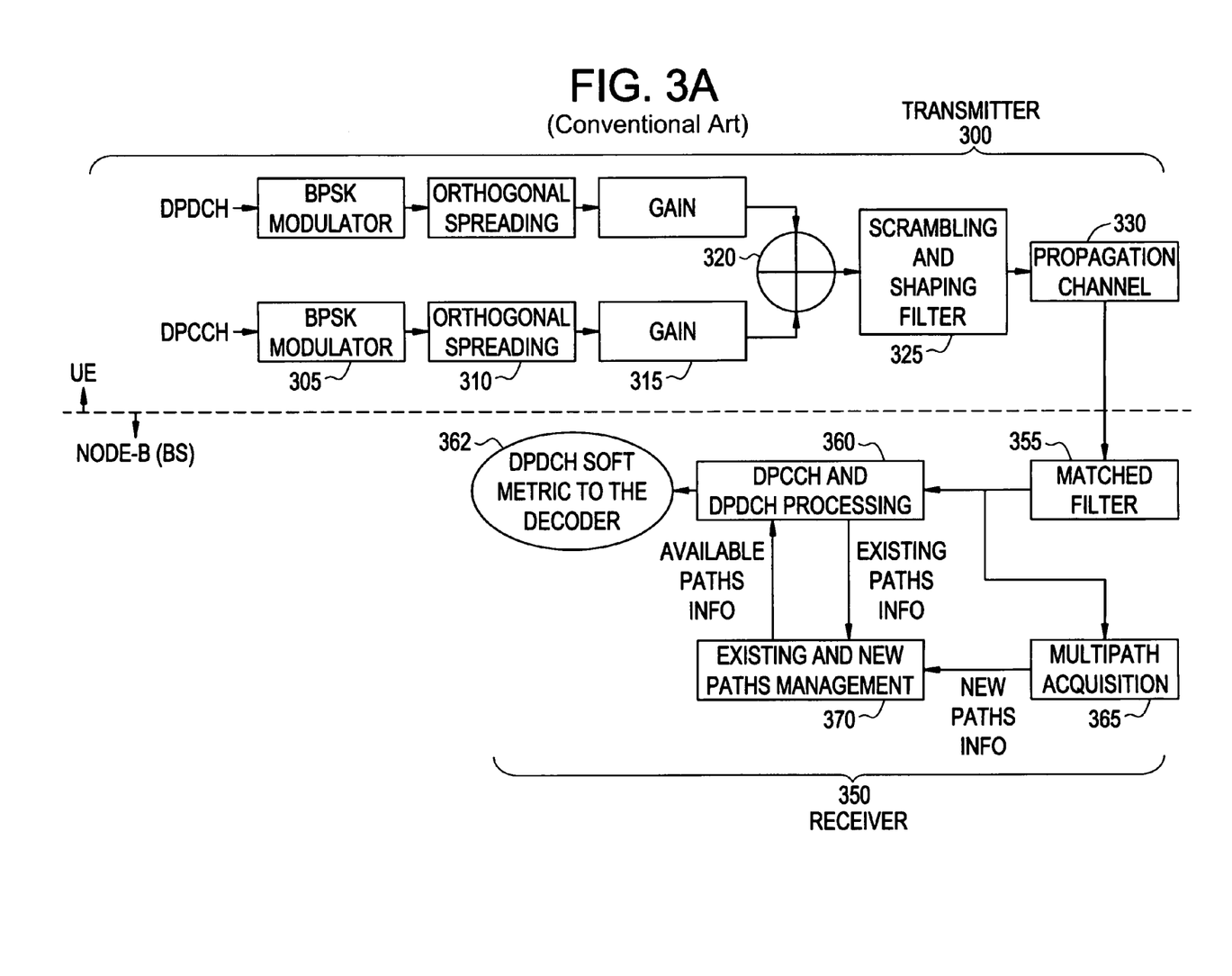
FIG. 3A illustrates a conventional UMTS uplink transmitter and receiver.

FIG. 3A illustrates a conventional UMTS uplink transmitter 300 (e.g., located at the legacy UEs 105 of FIG. 1) and receiver 350 (e.g., located at one of Node Bs 120/122/124 of FIG. 1). Although FIG. 3A illustrates a conventional transmitter 300 and receiver 350 for transmitting uplink dedicated channels (e.g., DPDCHs and DPCCH) it will be understood that enhanced uplink dedicated channels (e.g., E-DPDCHs and E-DPCCH) may be transmitted and received in the same manner.

As shown in FIG. 3A, the transmitter 300 includes, for each of the DPDCH 240 and the DPCCH 220, a binary phase shift keying (BPSK) modulator 305, an orthogonal spreading unit 310, and a gain unit 315. Frames (e.g., frame 200) associated with the DPCCH 240 and the DPDCH 220 are modulated at respective BPSK Modulators 305, and the modulated frames are then orthogonally spread at the respective orthogonal spreading unit 310. The spread modulated frames are received by the gain units 315 where an amplitude of the spread modulated frames may be adjusted. The outputs of each of the gain units 315 are combined (e.g., code-division multiplexed) into a combined signal by a combiner unit 320. The combined signal is scrambled and filtered by a shaping filter 325, and the output of the shaping filter 325 is sent to the receiver 350 via a propagation channel (e.g., over the air).

The receiver 350 includes a matched filter unit 355 for filtering signals received from the transmitter 300, for example, on propagation path 330. That is, namely, the matched filter 355 performs a filtering operation in conjunction with that of the shaping filter 325. The filtered signal is sent to the processing block 360 and the multi-path acquisition unit 365.

The multi-path acquisition unit 365 analyzes a range of path positions or path offsets, alternatively referred to as "hypotheses", and reports on positions within the range of path positions having a high signal energy (e.g., above a given threshold) as being "available". The path management unit 370 compares the available paths with existing path information including path offsets received from the processing block 360. Based on the comparison, the path management unit 370 removes duplicate paths from the available paths and sends the resulting path information to the processing block 360 in the form of available paths information at a given interval. Likewise, the existing path information may be received by the path management unit 370 from the processing block 360 at the given interval. In an example, the given interval may correlate to each frame (e.g., every 10 ms).

Figure 3B:
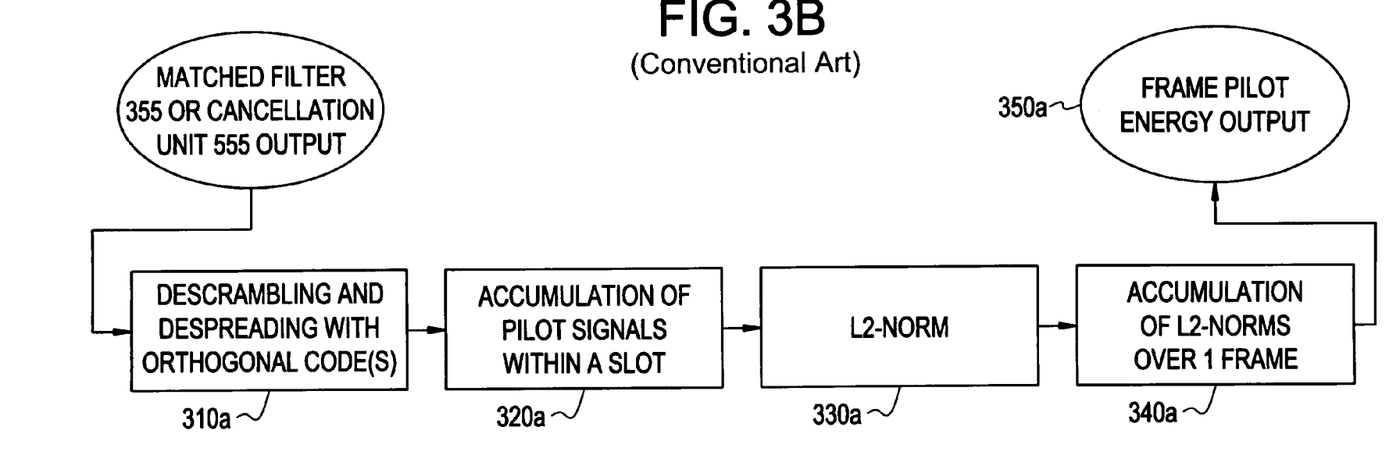
FIGS. 3B and 3C illustrate process flows for conventional multi-path acquisition.
Figure 3C:
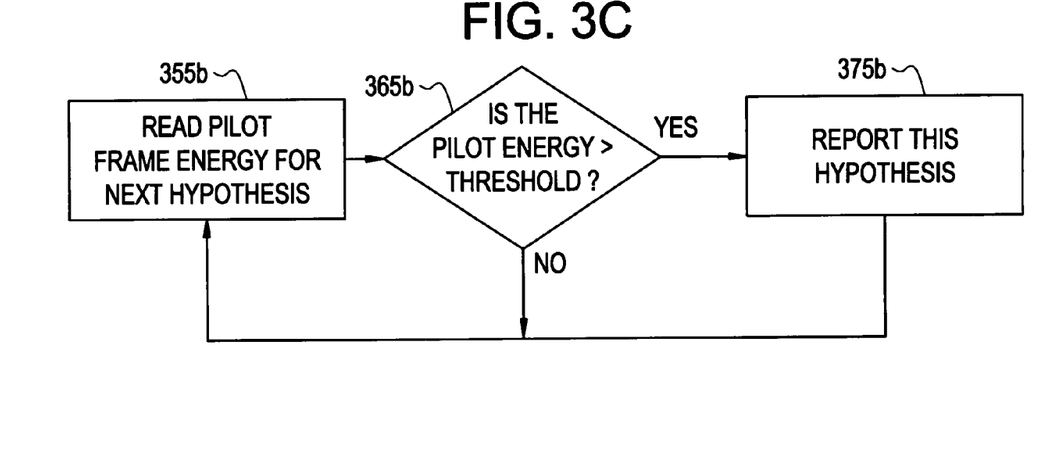

FIGS. 3B and 3C illustrate process flows for conventional multi-path acquisition, which generally describe the processing in multi-path acquisition unit 365 of FIG. 3A. Referring to FIG. 3B, the pilot energy over a frame is calculated for a specific path position (hypothesis). The specific path position may be a path offset from the range of possible path offsets provided by the RNC or derived from the processing block 360 in the existing paths information as discussed in detail below.

Returning to FIG. 3B, the output from the matched filter 355 corresponding to this hypothesis (which is a complex signal) is descrambled and despreaded (310a), and the pilot pattern is also removed by function 310a as well. The output symbols corresponding to pilot bits are next accumulated (320a) by simple addition over each slot. The output of this block is at a slot rate, i.e., one (complex) output per slot.

Next, the L2-norm of the output from 320a is formed (330a). Assuming for example that the complex output signal is $z=a+j*b$, the L2-norm may be given by $L2(z)=a^2+b^2$. The L2-norms of the accumulated pilot signal are further accumulated over the frame interval (340a), and the resultant output is the frame pilot energy (350a).

Referring to FIG. 3C, the frame pilot energy for each hypothesis (355b) is compared with a threshold (365b). Hypotheses with frame pilot energy surpassing the threshold (output of 365 is 'YES') are reported (375b) to the existing and new paths management block 370 in FIG. 3A for further processing.

Returning to FIG. 3A, as stated above, the output from the matched filter 355 is also sent to the processing block 360 to generate DPDCH soft symbols for decoding the received signal with turbo decoders or convolutional decoders (not shown) to obtain the transmitted data. The processing block 360 may generate the existing paths information including path offsets, channel estimates, and mobility of the user 105 for received propagation paths based on the received signal, and provides this existing paths information to the existing and new paths management unit 370.

In one example, the mobility of the user 105 may be determined with a mobility indicator, which may be an estimate of the bandwidth of the propagation channel, alternatively referred to as a Doppler spread of the propagation channel. Methodologies for determining the mobility indicator are well-known in the art. In another example, the received signal frame energy for the received signal on the propagation paths may be the DPCCH energy over a given frame (e.g., frame 200).

The processing block 360 may use the available paths information from the existing and new paths management unit 370 in further processing the received signal. As discussed above, this available paths information may be acquired with processing previously performed at the multi-path acquisition unit 365 and a path management unit 370.

When the above conventional methods of multi-path acquisition are applied in a multi-user environment (e.g., including enhanced and legacy users), the presence of the enhanced users (e.g., Release 6 users) presents increased interference (e.g., interference to legacy users), which overshadows the power levels of legacy (e.g., non-Release 6) users. Thus, multi-path acquisition performance for legacy users may be degraded.

SUMMARY OF THE INVENTION

An example embodiment of the present invention provides a method of multi-path acquisition. The method of multi-path acquisition may include estimating a contribution of acquired users of a first type to a received signal, canceling the estimated contribution from the received signal to generate a resultant signal, and performing multi-path acquisition for users of the first type and users of a second type based on the resultant signal. For example, the first type of users may be high data rate user such as Release 6 UMTS users, and the second type of users may be lower data rate users such as Release 4/5 UMTS users.

Another example embodiment of the present invention provides an apparatus comprising cancellation unit and a multi-path acquisition unit. The cancellation unit may be adapted to estimate a contribution of acquired users of a first type to a received signal, and cancel the estimated contribution from the received signal to generate a resultant signal. The multi-path acquisition unit may be adapted to perform multi-path acquisition for users of the first type and users of a second type based on the resultant signal.

Another example embodiment of the present invention provides a method comprising canceling a portion of a received signal associated with acquired users of a first type from the received signal to obtain a resultant signal for performing multi-path acquisition for users of the first type and users of a second type.

Another example embodiment of the present invention provides a method including modulating decoded data for each user of a first type to generate at least one modulated signal, delaying each of the modulated signals using at least one respective path offset, multiplying each of the delayed modulated signals by at least one respective channel estimate, and combining the output of the multiplying step to obtain an estimated contribution of acquired users of a first type to a received signal, the received signal including contributions from users of the first type and a second type.

In example embodiments of the present invention, the contribution of the acquired users may be a signal including data transmitted from the acquired users.

In example embodiments of the present invention, the contribution of the acquired users may form at least a portion of the received signal.

Example embodiments of the present invention may further include decoding data from the acquired users of the first type in the received signal, and the estimating step may estimate the contribution based on the decoded data and paths information associated with the acquired users of the first type. The paths information may include channel estimates and path offsets.

In example embodiments of the present invention, the estimating step may further include modulating the decoded data to generate at least one modulated signal, and generating the estimated contribution based on the modulated signal and the paths information.

In example embodiments of the present invention, the generating step may further include delaying each of the modulated signals using at least one respective path offset, multiplying each of the delayed modulated signals by at least one respective channel estimate, and combining output of the multiplying step to obtain the estimated contribution.

Example embodiments of the present invention may further include filtering the estimated contribution, and subtracting the estimated contribution from the received signal to generate the resultant signal.

In example embodiments of the present invention, the users of a first type may be higher data rate users than users of the second type and/or the resultant signal may include contributions from new users of the first type and both acquired and new users of the second type.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE EXAMPLE EMBODIMENTS

As discussed above, a multi-user environment may include at least a first type of user 105, which may be a higher data rate user such as a UMTS Release 6 user, referred to herein as an enhanced user, and a second type of user, which may be a lower data rate user such as a UMTS Release 4/5 user, referred to herein as a legacy user. The enhanced users 110 and the legacy users 105 transmit signals to a serving Node B 120/122/124 simultaneously over enhanced dedicated channels (e.g., E-DPDCHs and E-DPCCH) and dedicated channels (e.g., DPDCHs and DPCCH), respectively. As discussed above, these enhanced and legacy dedicated physical channels may be transmitted over respective propagation channels, each of which may include multiple propagation paths.

Figure 4:
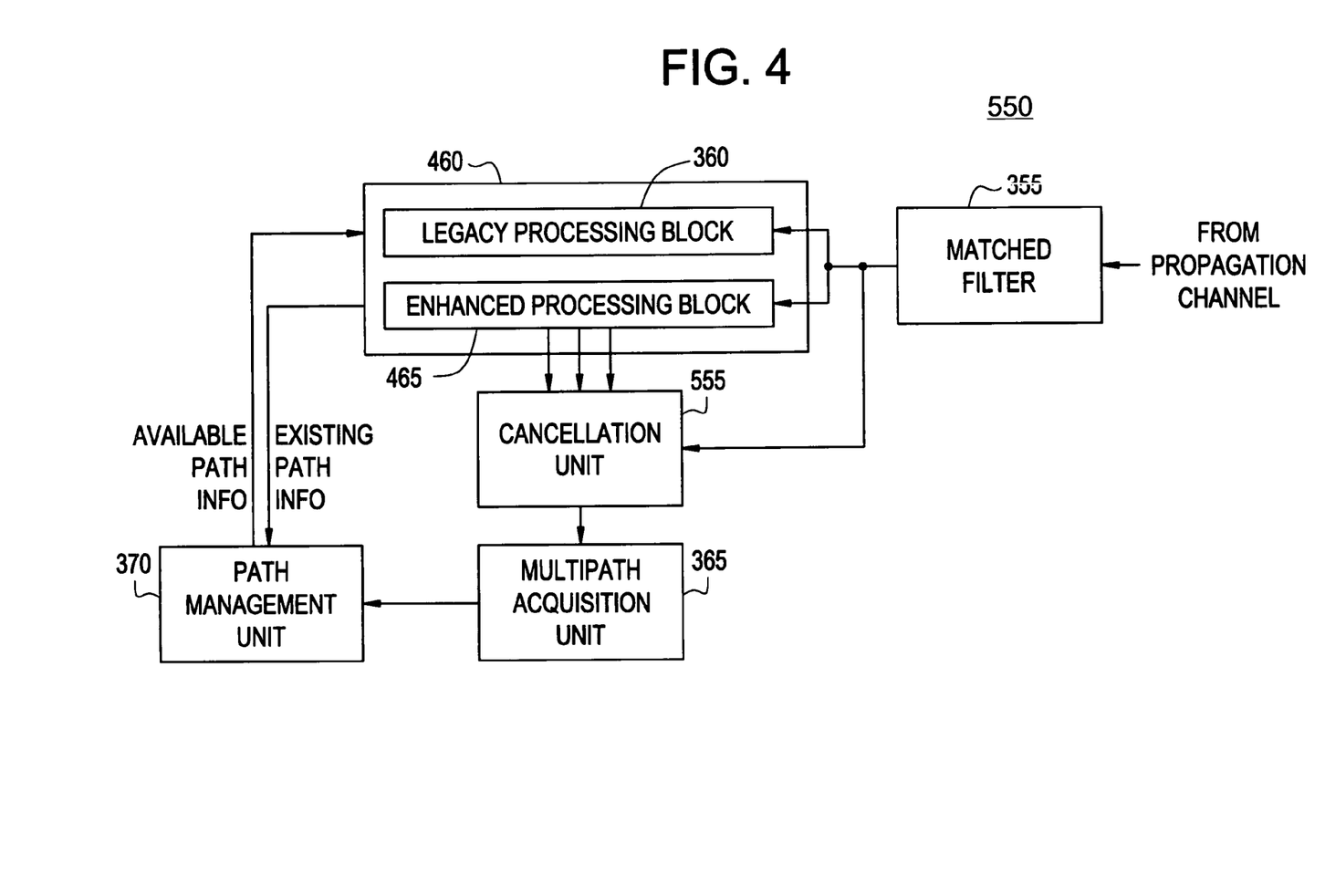
FIG. 4 illustrates a UMTS uplink receiver according to an example embodiment of the present invention.

FIG. 4 illustrates an uplink UMTS receiver, according to an example embodiment of the present invention. The receiver shown in FIG. 4 may be located at, for example, Node Bs 120/122/124 as shown in FIG. 1. For exemplary purposes example embodiments of the present invention will be discussed with regard to the conventional system of FIG. 1; however, it will be understood that example embodiments of the present invention may be implemented in conjunction with any suitable telecommunications network (e.g., UMTS, CDMA2000, etc.).

Referring to FIG. 4, the uplink receiver 550 may be similar to the conventional uplink receiver 350 (of FIG. 3A); however, the uplink receiver 550 may include a processing block 460 instead of processing block 360 and may further include a cancellation unit 555 positioned between the matched filter 355 and the multi-path acquisition unit 365. Accordingly, for the sake of brevity, only these differences will be described in detail.

In operation, the matched filter 355 may filter a received signal including data transmitted by one or more legacy users 105 and enhanced users 110. That is, the matched filter 355 may filter a received signal including signal energy from both legacy users 105 and enhanced users 110. The matched filter 355 may output the filtered signal to the cancellation unit 555 and the processing block 460, for example, concurrently (e.g., simultaneously, etc.).

The processing block 460 may include a legacy processing block 360, which may perform conventional legacy processing on the signal received from the legacy user 105 based on available path information received from the path management unit 370. In example embodiments of the present invention, the processing of the signal received from the legacy user 105 may be processed as discussed above with regard to FIG. 3A. An enhanced processing block 465 in the processing block 460 processes the signals received from enhanced users 110 in substantially the same manner as the legacy processing block 360.

Figure 5:
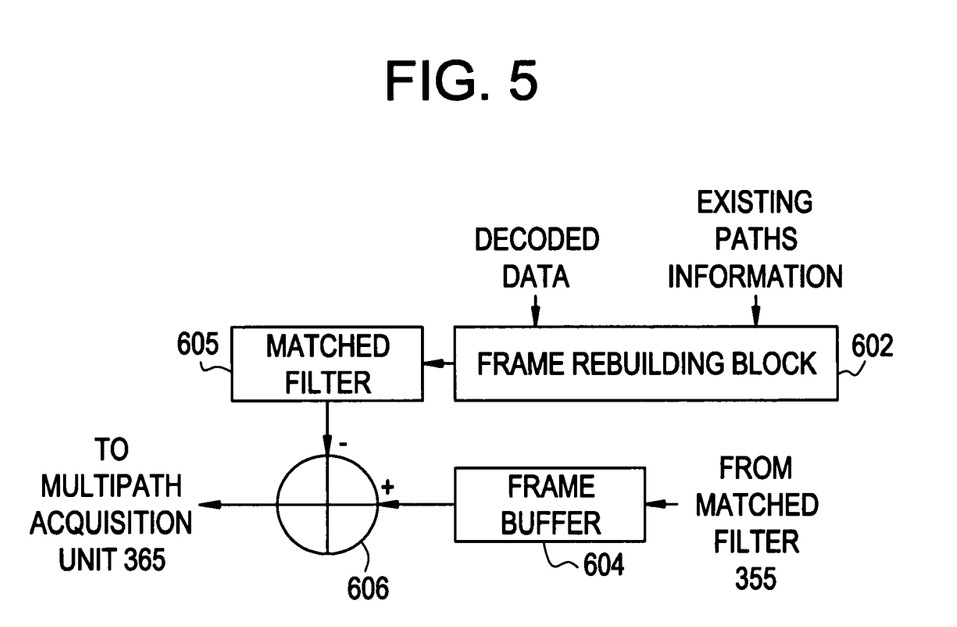
FIG. 5 illustrates a cancellation unit according to an example embodiment of the present invention.

Namely, the processing block 465 may generate E-DPDCH soft symbols for decoding the received signal with turbo decoders (not shown) to obtain the transmitted data based on available path information received from the path management unit 370. The processing block 465 may generate the existing paths information including, for example, path offsets, channel estimates, and a mobility of the enhanced user 110 for received propagation paths based on the received signal. As shown in FIG. 5, the existing paths information may be provided to the cancellation unit 555 and the existing and new paths management unit 370.

After decoding the received data, the processing block 465 may also output the decoded data to the cancellation unit 555. As discussed herein, methods for decoding received data, generating channel estimates, and generating existing paths information are well-known in the art and will not be discussed further herein for the sake of clarity.

The cancellation unit 555 may cancel the signal received from existing enhanced users 10 (over existing propagation paths) from the matched filter output. The cancellation unit 555 may output the resultant signal to the multi-path acquisition unit 365. That is, namely, the cancellation unit 555 may remove the signal (or propagation path) energy associated with existing propagation paths for the enhanced users 10. The resultant signal output from the cancellation unit 555 may, therefore, include signal energy associated with new (unknown) propagation paths for enhanced users and both existing and unknown propagation paths for legacy users. The operation of the cancellation unit 555 will be discussed in more detail below with respect to FIG. 5.

Subsequently, the multi-path acquisition block 365 may perform the processes as described above with regard to FIG. 3B and 3C on the resultant signal output from the cancellation unit 555. That is, new propagation paths for both enhanced and legacy users may be determined based on the resultant signal.

FIG. 5 is a more detailed illustration of the cancellation unit 555 according to an example embodiment of the present invention. As shown in FIG. 5, the cancellation unit 555 may include a frame rebuilding block 602, a frame buffer 604, a matched filter 605 and a subtraction block 606.

In operation, the frame buffer 604 may receive and buffer the filtered signal output from the matched filter 355. The frame buffer 604 may buffer the matched filter output by the operation time of the frame rebuilding block 602 and the matched filter 605.

While the matched filter output is buffered in the frame buffer 604, the rebuilding block 602 may recreate signals received from the enhanced users 110 over existing propagation paths based on the channel estimates, existing paths information, and decoded data provided by the processing block 465. The manner in which the received signal may be recreated will be described in more detail below with regard to FIG. 6.

The recreated signal may then be output to a matched filter 605, which may filter the rebuilt signal. The matched filter 605 may be the same as the matched filter 355. After filtering the recreated signal, the buffered signal in the frame buffer 604 and the filtered recreated signal may be output to the subtraction block 606.

At the subtraction block 606, the recreated signal may be cancelled (e.g., removed, subtracted, etc.) from the buffered signal, for example, using simple subtraction as is well-known in the art, and the resultant signal may be output to the multi-path acquisition block 365. In example embodiments of the present invention, the recreated signal may represent a contribution of acquired (e.g., existing or known) enhanced users to the original received signal buffered in the frame buffer 604.

Figure 6:
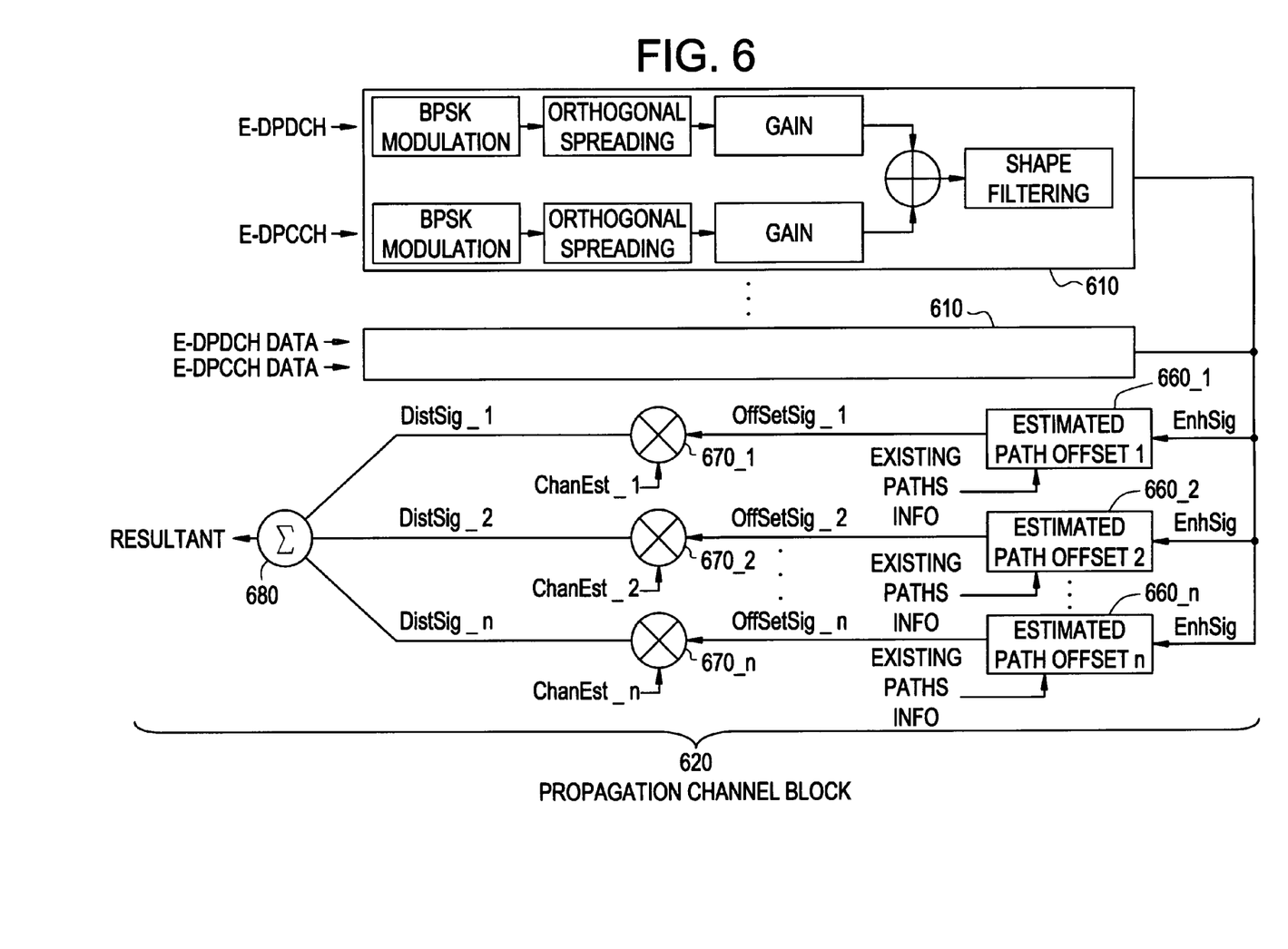
FIG. 6 illustrates a rebuilding block according to an example embodiment of the present invention.

FIG. 6 is a more detailed illustration of the rebuilding block 602 according to an example embodiment of the present invention. As shown in FIG. 6, the rebuilding block 602 includes a user function block 610 and a propagation channel block 620.

In operation, the user function block 610 may perform operations identical to those performed by the transmitter 300 discussed above with regard to FIG. 3A. That is, namely, for example, the user function block 610 may perform BPSK modulation, orthogonal spreading, amplitude adjustment, combining, scrambling, shaping filtering, and modulation on the decoded E-DPDCH and E-DPCCH data provided by the processing block 465. The modulated signal may then be output to the propagation channel block 620.

As discussed above, the enhanced user 110 may transmit data (referred to as a signal when modulated) over a propagation channel. As shown in FIG. 5, the propagation channel block 620 may simulate the effects of each existing propagation path on the transmitted signal. That is, the propagation channel block may transform the modulated signal transmitted by the enhanced user 110 into the form at which the received signal is received at the receiver and input to the matched filter 355. This simulation or transformation may be performed via path offset blocks 660_1-660_n, multipliers 670_1-670_n, and a combiner 680.

In operation, the modulated enhanced signal EnhSig may be input to path offset blocks 660_1-660_n, which may apply a path offset (or estimated propagation delay) to the modulated enhanced signal EnhSig. The path offset may be received from the processing block 465 in the form of existing paths information. Each of the path offset estimation blocks 660_1-660_n may output a respective delayed version of the modulated signal $OffsetSig_{13}$ 1-OffsetSig_n to the multipliers 670_1-670_n, respectively.

At the multipliers 670_1-670_n, each signal OffsetSig_1-OffsetSig_n may be combined with channel estimates ChanEst_1-ChanEst_n, respectively. The channel estimates ChanEst_1-ChanEst_n may also be provided by the processing block 465 in the existing paths information.

Each of the multipliers 670_1-607_n may output a signal DistSig_1-DistSig_n, representing distorted signals OffsetSig_1-OffsetSig_n, to the combiner 680. At the combiner 680, the signals DistSig_1-DistSig_n may be combined into the recreated signal. The recreated signal may then be output to the matched filter 605.

In example embodiments of the present invention, the multi-path acquisition blocks for enhanced and legacy users (Release 6 and non-Release 6) may not read the data directly from a matched filter. Instead, the data may be buffered for at least a frame (e.g., 10 ms), to wait for the outcome from the processing block 465. The decoded E-DPDCH and E-DPCCH data may then be used to recreate the enhanced user signals. This signal represents the existing enhanced user signals or, in other words, the signal may represent an estimated contribution of acquired enhanced users to the original received signal. The resultant signal is then subtracted from the original received signal, which is buffered in the frame buffer.

The resultant signal may therefore only contain signal energy from known and unknown legacy users and/or new (or unknown) enhanced users and/ or new paths of the acquired users of the first type. In example embodiments of the present invention, the enhanced users may transmit at enhanced transmission rates or, in other words, transmission rates higher than those used by the legacy users.

In example embodiments of the present invention, since the energy of the known enhanced user(s) is removed, new propagation paths for the enhanced user as well as propagation paths for the legacy users may be more readily detected.

Example embodiments of the present invention may improve multi-path acquisition for enhanced users (e.g., users attempting to access a wireless network via enhanced channels) and/or reduce the effect of the enhanced users on legacy users.

The invention being thus described, it will be obvious that the same may be varied in many ways. Such variations are not to be regarded as a departure from the invention, and all such modifications are intended to be included within the scope of the invention.

We claim:

1. A method of multi-path acquisition, comprising:
determining decoded data and path information associated with acquired users of a first type from a received signal, the path information including at least one path offset:
estimating a contribution of the acquired users of the first type to the received signal at least based on the path information and modulated, decoded data from the acquired users of the first type, the contribution of the acquired users forming at least a portion of the received signal, the estimating including,
generating the modulated, decoded data by modulating the decoded data corresponding to the acquired users of the first type, and generating the estimated contribution by at least delaying the modulated, decoded data using the at least one path offset;

canceling the estimated contribution from the received signal to generate a resultant signal; and performing multi-path acquisition for users of the first type and users of a second type based on the resultant signal, the users of the first type being higher data rate users than users of the second type.

2. The method of claim 1, wherein the contribution of the acquired users is a signal including data transmitted from the acquired users.

3. The method of claim 2, wherein the determining includes, decoding data from the acquired users of the first type in the received signal.

4. The method of claim 3, wherein the paths information includes channel estimates.

5. The method of claim 4, wherein the generating the decoded, modulated data step and the generating the estimated contribution step correspond to each of the acquired users of the first type.

6. The method of claim 5, wherein the generating the estimated contribution step comprises:

multiplying each of the delayed modulated signals by at least one respective channel estimate; and combining output of the multiplying step to obtain the estimated contribution.

7. The method of claim 5, further comprising:

filtering the estimated contribution; and subtracting the estimated contribution from the received signal to generate the resultant signal.

8. The method of claim 1, wherein the resultant signal includes contributions from new users of the first type or new paths of the acquired users of the first type and both acquired and new users of the second type.

9. An apparatus comprising:

a processing unit adapted to determine decoded data and path information associated with acquired users of a first type from a received signal, the path information including at least one path offset;

a cancellation unit adapted to, (1) estimate a contribution of the acquired users of the first type to the received signal at least based on the path information and modulated, decoded data from the acquired users of the first type, the contribution of the acquired users forming at least a portion of the received signal, wherein the cancellation unit is further adapted to estimate the contribution by, generating the modulated, decoded data by modulating the decoded data corresponding to the acquired users of the first type, and generating the estimated contribution by at least delaying the modulated, decoded data using the at least one path offset, and (2) cancel the estimated contribution from the received signal to generate a resultant signal; and a multi-path acquisition unit adapted to perform multi-path acquisition for users of the first type and users of a second type based on the resultant signal, the users of the first type being higher data rate users than users of the second type.

10. A method comprising:

determining decoded data and path information associated with acquired users of a first type from a received signal, the path information including at least one path offset;

estimating a contribution of the acquired users of the first type to the received signal at least based on the path information and modulated, decoded data from the acquired users of the first type, the estimating including, generating the modulated, decoded data by modulating the decoded data corresponding to the acquired users of the first type, and generating the estimated contribution by at least delaying the modulated, decoded data using the at least one path offset; and canceling a portion of the received signal corresponding to the estimated contribution of the acquired users of the first type from the received signal to obtain a resultant signal for performing multi-path acquisition for users of the first type and users of a second type, the users of the first type being higher data rate users than users of the second type.

11. A method comprising:

determining decoded data and path information associated with acquired users of a first type from a received signal, the path information including at least one respective path offset;

modulating the decoded data for each user of the first type to generate at least one modulated signal;

delaying each of the modulated signals using the at least one respective path offset;

multiplying each of the delayed modulated signals by at least one respective channel estimate; and combining the output of the multiplying step to obtain an estimated contribution of the acquired users of the first type to the received signal, the received signal including contributions from users of the first type and a second type, the users of the first type being higher data rate users than users of the second type.

* * * * *